US008232681B2

(12) United States Patent
Lopez

(10) Patent No.: US 8,232,681 B2
(45) Date of Patent: Jul. 31, 2012

(54) HYBRID WIND-SOLAR INVERTERS

(75) Inventor: Miguel Bartolome Lopez, Leon (ES)

(73) Assignee: General Electric Company, Schenectady, NY (US)

(*) Notice: Subject to any disclaimer, the term of this patent is extended or adjusted under 35 U.S.C. 154(b) by 4 days.

(21) Appl. No.: 12/693,846

(22) Filed: Jan. 26, 2010

(65) Prior Publication Data

US 2011/0101784 A1    May 5, 2011

(30) Foreign Application Priority Data

Oct. 30, 2009   (EP) .................................... 09382234

(51) Int. Cl.
*H02J 1/00* (2006.01)
(52) U.S. Cl. ........................................................ 307/86
(58) Field of Classification Search ...................... 307/86
See application file for complete search history.

(56) References Cited

U.S. PATENT DOCUMENTS

| 5,598,041 | A  | * | 1/1997 | Willis ............................. 307/43 |
| 6,194,793 | B1 | * | 2/2001 | Fisher, Jr. ........................ 307/66 |
| 6,256,212 | B1 |   | 7/2001 | Wobben |
| 6,339,538 | B1 |   | 1/2002 | Handleman |
| 6,372,978 | B1 |   | 4/2002 | Cifaldi |
| 6,377,027 | B2 | * | 4/2002 | Takemoto .................... 320/135 |
| 7,099,169 | B2 |   | 8/2006 | West et al. |
| 2005/0200133 | A1 | | 9/2005 | Wobben |
| 2005/0270000 | A1 | | 12/2005 | Chang et al. |
| 2008/0217998 | A1 | | 9/2008 | Parmley |
| 2009/0179500 | A1 | | 7/2009 | Ragonese et al. |

FOREIGN PATENT DOCUMENTS

| DE | 102006023563 A1 | 11/2007 |
| EP | 2104200 A1 | 9/2009 |
| EP | 2104216 A1 | 9/2009 |
| GB | 2452787 A1 | 3/2009 |
| WO | 2005076445 A1 | 8/2005 |

OTHER PUBLICATIONS

European Search Report dated Apr. 12, 2010, Munich.

* cited by examiner

*Primary Examiner* — Hal Kaplan
(74) *Attorney, Agent, or Firm* — Sutherland Asbell & Brennan LLP

(57) ABSTRACT

Certain embodiments of the invention may include systems and methods for providing a hybrid wind-solar inverter. According to an exemplary embodiment of the invention, a method for directing power from alternative power sources to an electrical grid is provided. The method can include: receiving at least two input DC power signals from a plurality of power sources; receiving one or more control signals from the electrical grid; directing, based at least in part on the one or more control signals, at least some of the input DC power signals to an output DC power signal; and, transforming the output DC power signal to an output AC power signal for transmission via the electrical grid.

20 Claims, 3 Drawing Sheets

HYBRID WIND-SOLAR INVERTERS

CROSS-REFERENCE TO RELATED APPLICATION

This application claims benefit of European Patent Application No. 09382234.4, filed Oct. 30, 2009, which is incorporated herein by reference in its entirety.

FIELD OF THE INVENTION

This invention generally relates to power conversion, and, more particularly, relates to power conversion for hybrid wind-solar power sources.

BACKGROUND OF THE INVENTION

It is known that electrical power may be harvested from renewable energy sources, such as sunlight and wind, using photovoltaic arrays (also known as solar panels) and wind turbines, respectively. It is also known that photovoltaic arrays stop producing power at night, and that energy production is significantly reduced when cloud coverage interrupts or obscures the sunlight. Wind turbines, on the other hand, may continue to produce power as long as the wind is blowing, and therefore may be used in conjunction with photovoltaic arrays to increase and/or stabilize the power output from an alternative energy power plant, particularly at night and during overcast days.

With few exceptions, power plants produce alternating current (AC) synchronized in frequency and phase with the power grid. However, photovoltaic arrays naturally produce direct current (DC) power output when exposed to sunlight. Thus, an inverter is used for transforming or converting the DC output from the photovoltaic array to an AC signal appropriate for coupling to the power grid. Wind turbines can generate AC power output, but the frequency and phase of the wind turbine output depends, respectively, on the rotation speed and position of a rotor within the turbine generator. Therefore, the AC power produced by the wind energy system is typically rectified to produce an intermediate DC power signal. The DC power signal is then transformed to AC via a line-commutated inverter to match the line frequency and phase of the grid.

Each inverter adds costs to the power system in terms of component expense, power penalty, and complexity. Therefore, systems and methods are needed for converting power from wind and solar sources to a form that can be readily utilized by the power grid while reducing the component count and expense associated with redundant inverters. Systems and methods are also needed to provide hybrid wind-solar inverters.

SUMMARY OF THE INVENTION

Some or all of the above needs may be addressed by certain embodiments of the invention. Certain embodiments of the invention may include systems and methods for providing a hybrid wind-solar inverter. Other embodiments can include systems and methods for converting power from wind and solar sources to a form that can be readily utilized by the power grid while reducing the component count and expense associated with redundant inverters.

According to an exemplary embodiment of the invention, a method for directing power from alternative power sources to an electrical grid is provided. The method can include receiving at least two input DC power signals from a plurality of power sources; receiving one or more control signals from the electrical grid; directing, based at least in part on the one or more control signals, at least some of the input DC power signals to an output DC power signal; and, transforming the output DC power signal to an output AC power signal for transmission via the electrical grid.

According to an exemplary embodiment of the invention, a system for supplying alternative power to an electrical grid is provided. The system can include a plurality of power sources, one or more AC-to-DC inverters for transforming AC power signals from the power sources to at least one derived DC power signal, and a controller operable to receive power signals from the plurality of power sources and the one or more AC-to-DC inverters. The controller may receive control signals from the electrical grid, and direct, based at least in part on the control signals, at least some of the received power signals from the plurality of power sources and the one or more AC-to-DC inverters to a DC power output. The system may also include a DC-to-AC inverter for transforming the DC power output to an AC power output signal for transmission via the electrical grid.

According to an exemplary embodiment of the invention, a controller for directing power from alternative power sources to an electrical grid is provided. The controller may include inputs for receiving DC power signals from a plurality of power sources. The controller may also include inputs for receiving control signals from the electrical grid. The controller may further include circuitry for directing, based at least in part on the control signals, at least some of the received DC power signals to a DC power output.

Other embodiments and aspects of the invention are described in detail herein and are considered a part of the claimed invention. Other embodiments and aspects can be understood with reference to the description and to the drawings.

BRIEF DESCRIPTION OF THE FIGURES

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may enable the conversion of power from a plurality of alternative energy sources, including wind turbines and solar panels. The invention may reduce the number of inverters for transforming the source power generated from the alternative energy sources into a form suitable for coupling with an electrical grid.

According to an exemplary embodiment of the invention, a controller may monitor and direct rectified power from one or more turbines, as well as DC power from one or more photovoltaic arrays to a common DC output. The common DC output may then be inverted (to AC) for coupling with the grid. By utilizing a multiple DC input controller with a common DC output, the number of output inverters may be significantly reduced.

Figure 1:
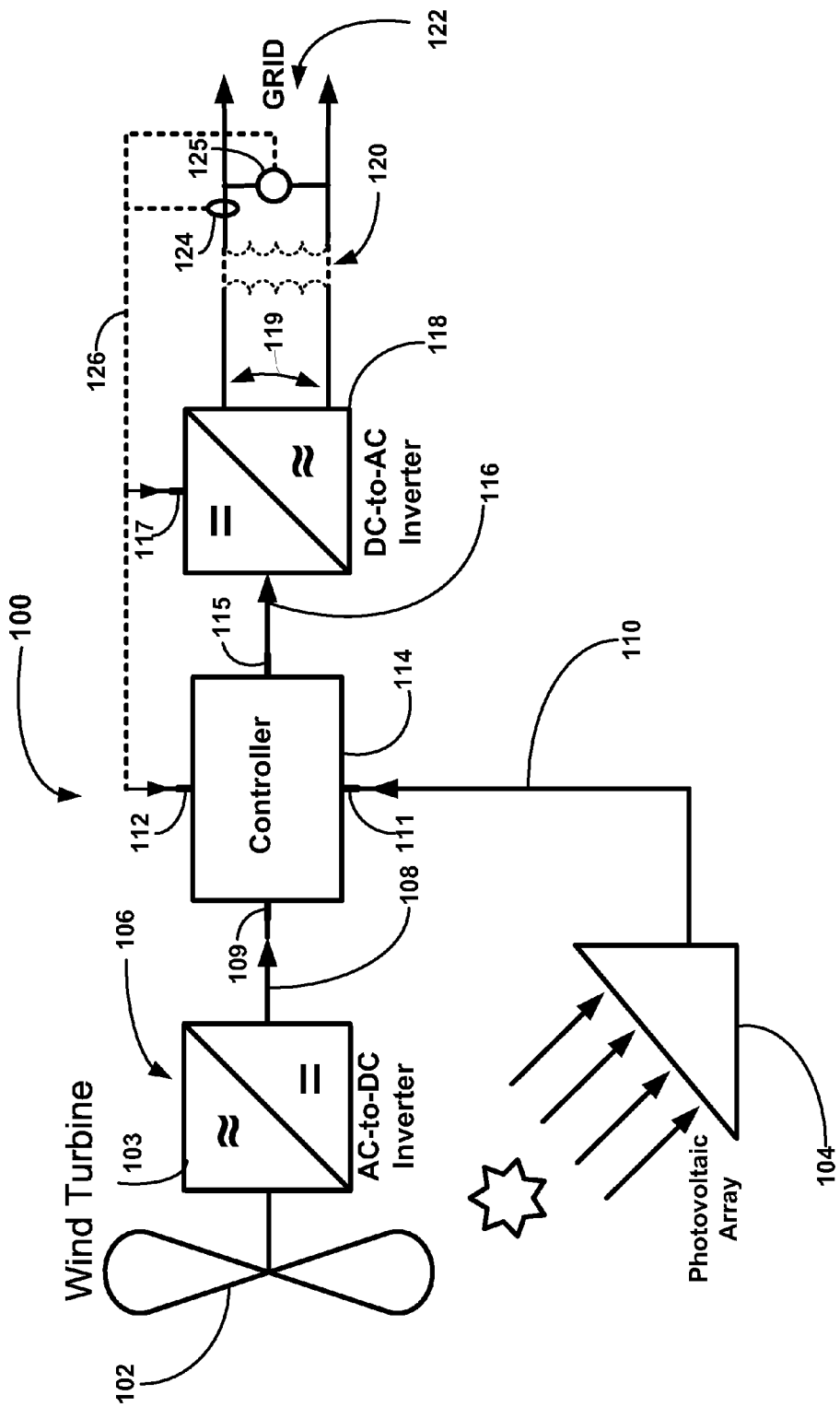
FIG. 1 depicts a block diagram illustrative hybrid wind-solar inverter system, according to an exemplary embodiment of the invention.

FIG. 1 is a block diagram of an exemplary alternative energy power generation system 100 that may simultaneously combine and direct electrical power generated from a wind turbine 102 and/or a solar panel or photovoltaic (PV) array 104 to a single output inverter 118 for coupling to an electrical grid 122. In this exemplary embodiment, the AC power 103 generated by the wind turbine 102 may be converted and/or transformed to DC by an input inverter 106, and the resulting DC wind power signal 108 may be in communication with the controller 114 via a first DC power input terminal 109. In addition, a DC solar power signal 110 may be provided by a PV array 104 and may be in communication with the controller 114 via a second DC power input terminal 111. The controller 114 may direct the aggregated DC power 116 from both the wind and solar sources to an output inverter 118 via output terminal 115. The output inverter 118 may transform and/or convert the aggregated DC power signal 116 to an AC output power signal 119 for coupling to the electrical grid 122. The AC output power signal 119 may couple to the electrical grid 122 directly, or via an optional output transformer 120 as shown in FIG. 1.

According to an exemplary embodiment of the invention, the output inverter 118 may receive one or more electrical grid signals 126 from a grid current sensor 124 and/or a grid voltage sensor 125 at terminal 117, and may utilize the electrical grid signals 126 to synchronize and/or commutate the AC output power signal 119 at the appropriate voltage amplitude, phase, VAR, and/or frequency appropriate for coupling power to the electrical grid 122. The electrical grid signals 126 may also be received at terminal 112 and may be utilized at the controller 114 for directing power signals, as will be discussed below with reference to FIG. 2.

Figure 2:
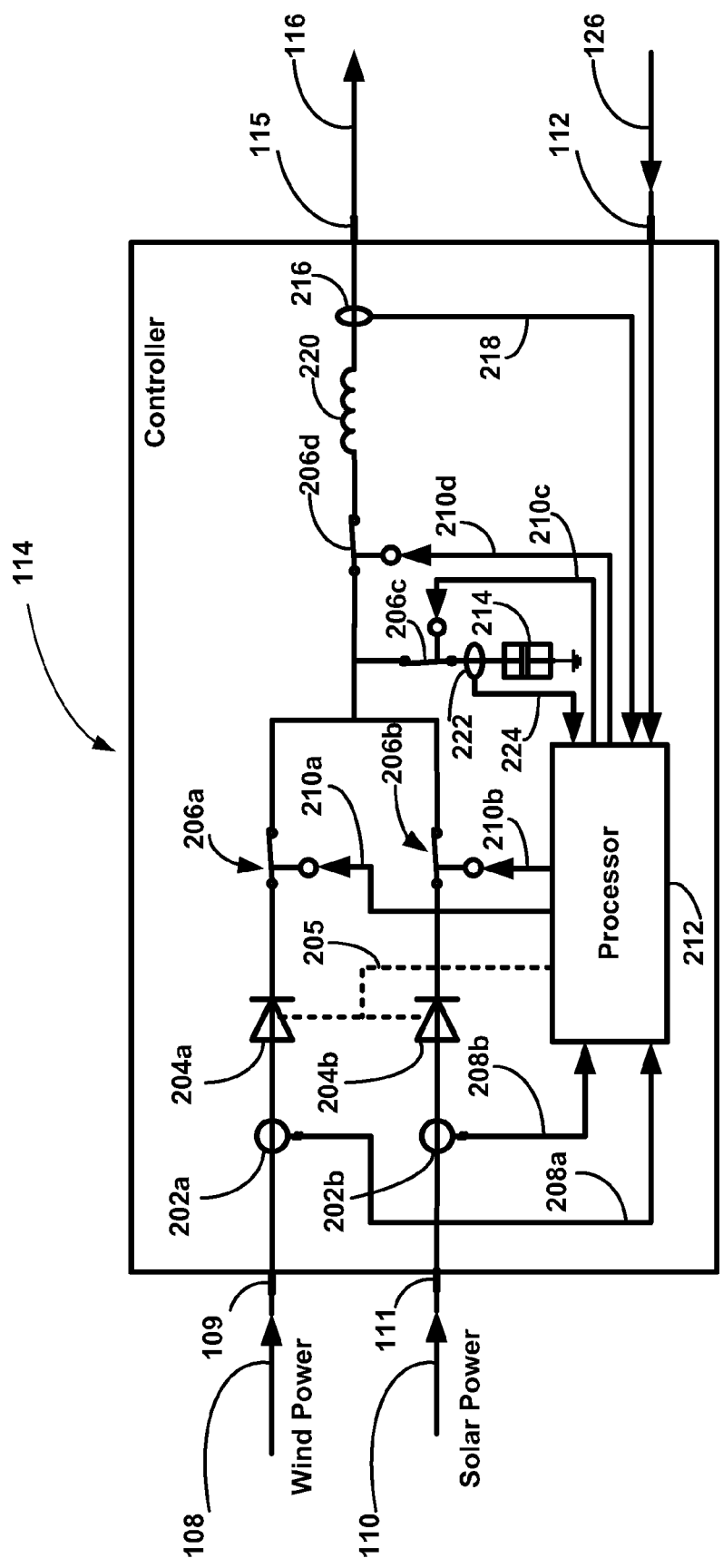
FIG. 2 depicts a block diagram illustrative controller for directing power from alternative energy sources to a DC output, according to an exemplary embodiment of the invention.

FIG. 2 illustrates a controller 114 according to an exemplary embodiment of the invention. The controller 114 may include input terminals 109, 111 and associated circuitry for receiving and directing power from a predefined number of alternative energy sources. According to other exemplary embodiments, the controller 114 may include additional terminals and associated circuitry for receiving power signals from any number of power sources, but for simplicity and illustration purposes, only two power inputs are depicted in the exemplary embodiment of FIG. 2.

According to an exemplary embodiment of the invention, the input power signals 108, 110 may be monitored by power input sensors 202a, 202b to produce respective detected power input signals 208a, 208b. According to an exemplary embodiment, the controller DC output 116 may also be monitored by a power output sensor 216 to produce a detected power output signal 218. According to exemplary embodiments, a combination of one or more of the detected power input signals 208a, 208b, a detected output power signal 218, a detected storage bank signal 224, and/or a grid signal 126 may be utilized by the processor 212 to control the switches [206a, 206b, 206c, 206d] to direct some or all of the input power signals 108, 110 to the controller DC output terminal 115, or alternatively, some or all of the input power signals 108, 110 may be directed to an energy storage bank 214.

According to exemplary embodiments of the invention, the storage bank 214 may include any combination of the following energy storage devices: rechargeable batteries, capacitor banks, inductors, and/or super-capacitors.

According to an exemplary embodiment of the invention, back-feed protection devices 204a, 204b may be included within the controller to prevent or otherwise minimize power from flowing back towards the alternative energy source. Therefore, the back-feed protection devices 204a, 204b can be considered as one-way devices in that they allow power to flow only one way—towards the output. According to exemplary embodiments, the back-feed protection devices 204a, 204b may be relatively simple diodes, or they may include combinations of diodes and semiconductor switching devices such as metal oxide field effect transistors (MOSFETs). Such devices may be passive or they may be actively controlled by the processor 212 via optional back-feed control signals 205.

According to exemplary embodiments of the invention, the switches 206a-206d, may be under the control of switching signals 210a-210d provided by the processor 212. The switches may include relays or semiconductor devices such as MOSFETs or insulated gate bipolar transistors (IGBTs). The switching signals 210a-210d may be based at least in part on one or more of the detected power input signals 208a, 208b, the detected power output signal 218, a detected storage bank signal 224, and/or the electrical grid signals 126. In an exemplary embodiment, a multi-input comparison may be made among all of the inputs 126, 208a, 208b, 218, 224, presented at the processor 212 to determine the state of the switching signals 210a-210d for controlling the switches 206a-206d. For example, the input power sensors 202a, 202b may detect that power is available from one or more of the power inputs 108, 110, but the grid signals 126 may indicate that there is no demand for power. In such a case, it may be appropriate for all switches except 206d to close, thereby directing the excess power being generated to a storage bank 214. In another example, the power sensors 202a, 202b may detect that intermittent power is available from one or more power inputs 108, 110, but the grid signal 126 may indicate that there is demand for power. In such a case, the processor 212 may monitor and compare the detected power input signals 208a, 208b and the detected storage bank signal 224, derived from the storage bank detector 222. If the detected storage bank signal 224 indicates that the storage bank 214 has power available, and if the detected power input signals 208a, 208b indicate that no alternative power is being generated (for example, there is cloud coverage and no wind is blowing), then the processor 212 may direct at least the storage bank switching circuit 206c and the output switching circuit 206d to close so that power from the storage bank 214 may flow to the controller DC output terminal 115. Conversely, if the detected storage bank signal 224 indicates that the storage bank 214 is drained, but the detected power input signals 208a 208b indicate that wind- and/or solar-generated power is available, then the processor 212 may send signals to close all switches except the output switching circuit 206d until the required level of DC power is reached at the storage bank 214 for proper operation of the output inverter 118, and closing the output switching circuit 206d afterwards so that power from the alternative energy sources 108, 110 may flow towards the DC output terminal 115.

According to an exemplary embodiment of the invention, the controller 114 may include an inductor 220 to suppress voltage and/or current spikes from propagating to the controller DC output 116. Additional filtering not shown in FIG. 2 may also be included to condition the DC output 116 signal from the controller 114.

It should be understood that each of the monitoring sensors 124, 125, 202a, 202b, 216, 222 depicted in FIG. 1 and FIG. 2 may measure any combination of voltage, current, phase, frequency, reactive power, ripple, etc.

Figure 3:
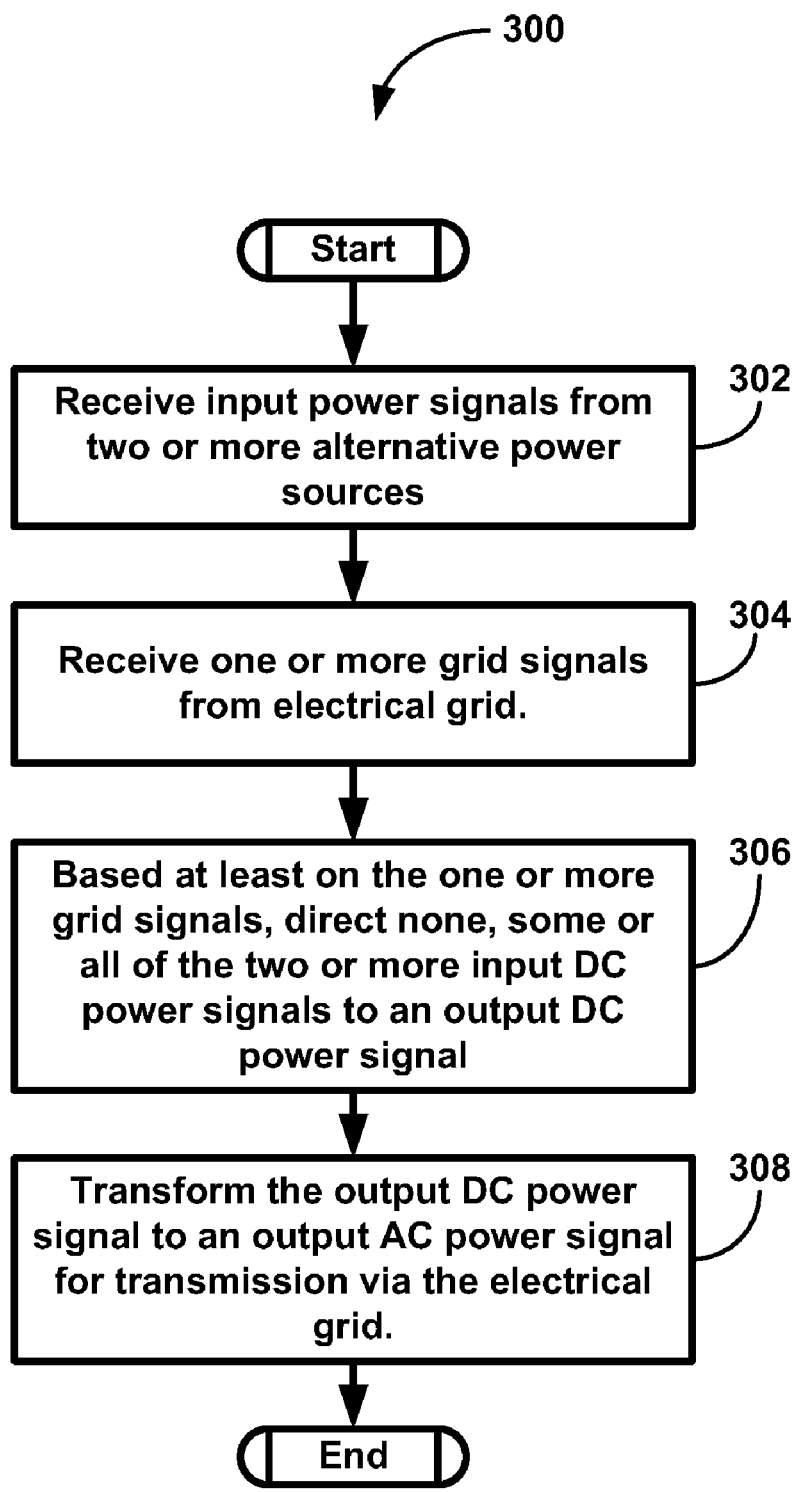
FIG. 3 is a flowchart for receiving, directing, and transforming power from alternative energy sources to an electrical grid, according to an exemplary embodiment of the invention.

An exemplary method 300 for directing power from the alternative energy sources to a power grid will now be described with reference to the flowchart of FIG. 3. Beginning in block 302, and according to an exemplary embodiment of the invention, input power signals may be received from two or more alternative power sources. The alternative power sources may include any combination of a wind turbine 102 with a wind turbine inverter 106 and a photovoltaic array 104. The power inputs from the power sources may substantially be in the form of DC. In block 304, and according to an exemplary embodiment of the invention, one or more grid signals 126 may be received from the electric grid 122. The grid signals 126 may include instantaneous information from the grid including voltage, current, frequency, phase, reactive power, amplitude, etc. In block 306, and according to an exemplary embodiment of the invention, none, some, or all of the received input DC power signals 108, 110 may be directed to an output DC power signal 116 based at least on the one or more grid signals 126. In block 308, according to an exemplary embodiment of the invention, the output DC power signal 116 may be transformed to an AC power signal 119 for transmission via the electrical grid 122.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of any appended claims. Although specific terms are employed herein, they are used in a generic and descriptive sense only and not for purposes of limitation.

The claimed invention is:

1. A method for directing power from alternative power sources to an electrical grid, the method comprising:
   receiving at least two input DC power signals from a plurality of power sources;
   receiving one or more control signals from the electrical grid;
   selectively directing a portion of the input DC power signals to a rechargeable battery;
   sensing available power from the at least two input DC power signals;
   selectively switching to couple with an output DC power signal, one or more of the at least two input DC power signals, based on the sensing of available power and the one or more control signals from the electrical grid;
   directing, based at least in part on the one or more control signals, at least some of the input DC power signals to an output DC power signal; and,
   transforming the output DC power signal to an output AC power signal for transmission via the electrical grid.

2. The method of claim 1, wherein receiving the input DC power signals from the plurality of power sources comprises receiving power from at least one of the following: a photovoltaic cell, a fuel cell, a battery, or a wind turbine.

3. The method of claim 1, wherein receiving one or more control signals from the electrical grid comprises receiving at least a current command.

4. The method of claim 1, wherein directing some of the input DC power signals to an output DC power signal comprises directing a portion of the input DC power signals to an energy storage device.

5. The method of claim 1, wherein directing some of the input DC power signals to an output DC power signal comprises selectively coupling one or more of the input DC power signals to the output DC power signal.

6. The method of claim 5, wherein the selectively coupling is based at least in part on sensing the power available at the at least two input DC power signals.

7. The method of claim 5, wherein the selectively coupling is performed by switching one or more of the at least two input DC power signals to selectively couple with the output DC power signal.

8. The method of claim 1, wherein transforming the output DC power signal to the output AC power signal for transmission via the electrical grid comprises converting the output DC power signal to an output AC power signal by a DC to AC inverter.

9. The method of claim 8, wherein the frequency and phase of the output AC power signal is controlled to match frequency and phase of the electrical grid.

10. A system for supplying alternative power to an electrical grid, the system comprising:
    a plurality of power sources;
    one or more AC-to-DC converters for transforming AC power signals from the power sources to at least one derived DC power signal;
    one or more rechargeable batteries for selectively storing DC power;
    a controller operable to
       receive power signals from the plurality of power sources and the one or more AC-to-DC converters;
       sense available power from the at least two input DC power signals;
       receive control signals from the electrical grid;
       selectively switch to couple with the output DC power signal, one or more of the at least two input DC power signals, based on the sensing of available power and the one or more control signals from the electrical grid;
       and
       direct, based at least in part on the control signals, at least some of the received power signals from the plurality of power sources, the one or more rechargeable batteries, and the one or more AC-to-DC converters to a DC power output; and,
    a DC-to-AC inverter for transforming the DC power output to an AC power output signal for transmission via the electrical grid.

11. The system of claim 10, wherein the plurality of power sources comprise at least one of the following: a photovoltaic cell, a fuel cell, a battery, or a wind turbine.

12. The system of claim 10, wherein the controller is further operable to receive control signals from the electrical grid, wherein the control signals comprise at least a synchronization signal.

13. The system of claim 10, wherein the controller is further operable to direct at least some of the received power signals to an energy storage device.

14. The system of claim 10, wherein the controller is further operable to selectively couple at least some of the received power signals to a DC power output by one or more switches.

15. The system of claim 14, wherein the one or more switches comprise one or more semiconductor switches.

16. The system of claim 10, wherein the DC-to-AC inverter adjusts the frequency and phase of the AC power output signal based at least in part on a synchronization signal received from the electrical grid.

17. A controller for directing power from alternative power sources to an electrical grid, the controller comprising:
- inputs for receiving DC power signals from a plurality of power sources;
- inputs for receiving control signals from an electrical grid;
- at least one input for receiving signals from a rechargeable battery;
- circuitry for sensing available power from the at least two input DC power signals;
- circuitry for selectively switching to couple with the output DC power signal, one or more of the at least two input DC power signals, based on the sensing of available power and the one or more control signals from the electrical grid;
- circuitry for directing, based at least in part on the control signals, at least some of the received DC power signals to a DC power output; and
- circuitry for selectively directing, based at least in part on the control signals, at least some of the signals from the rechargeable battery to the DC power output.

18. The controller of claim 17, further comprising at least one back-feeding protection device to protect the power sources.

19. The controller of claim 17, further comprising an energy storage device.

20. The controller of claim 17, wherein the circuitry for directing some of the received power signals to a DC power output comprises one or more switching devices.

* * * * *